Dec. 26, 1944.　　　K. W. COUSE　　　2,365,940
TRAVELING WORKSHOP
Filed April 6, 1944　　　7 Sheets-Sheet 3

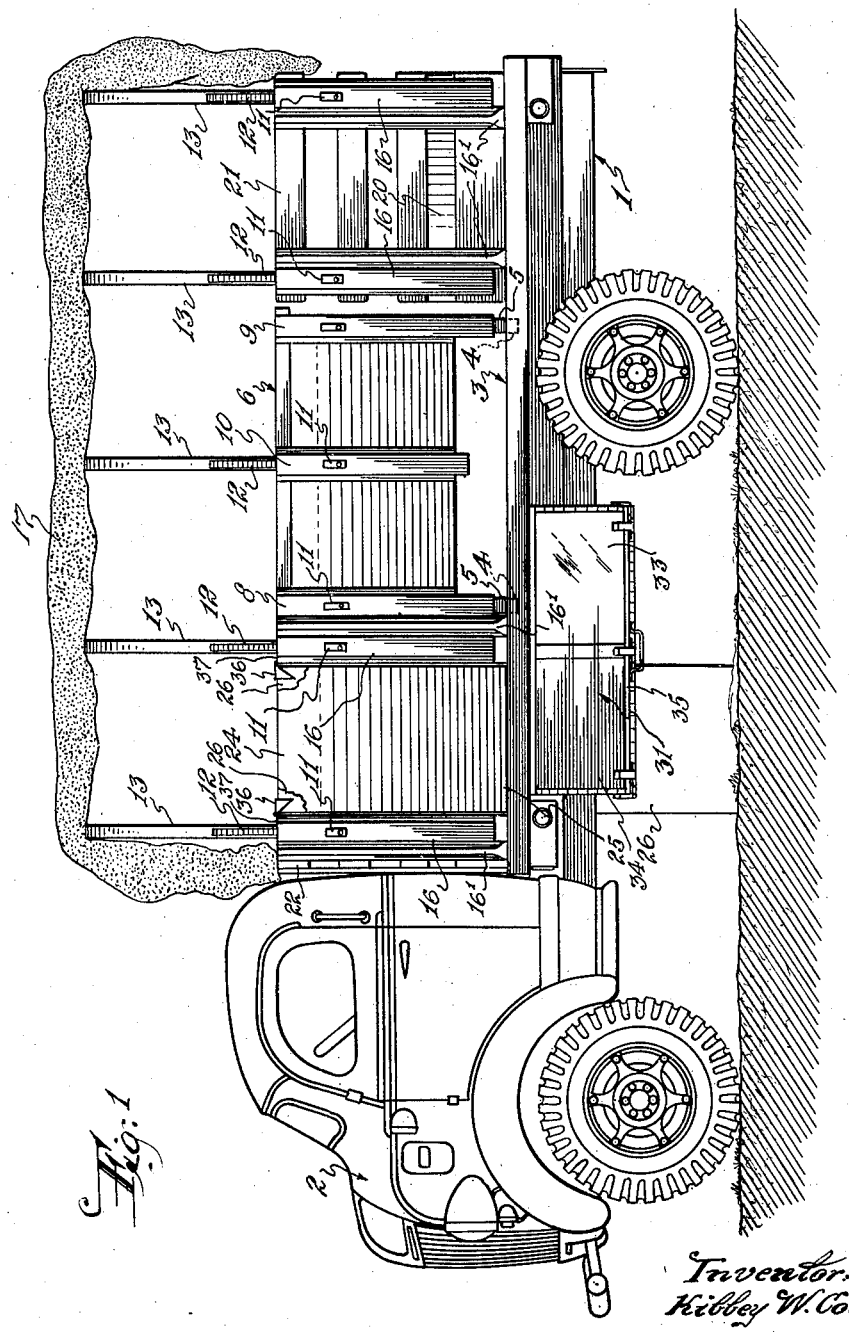

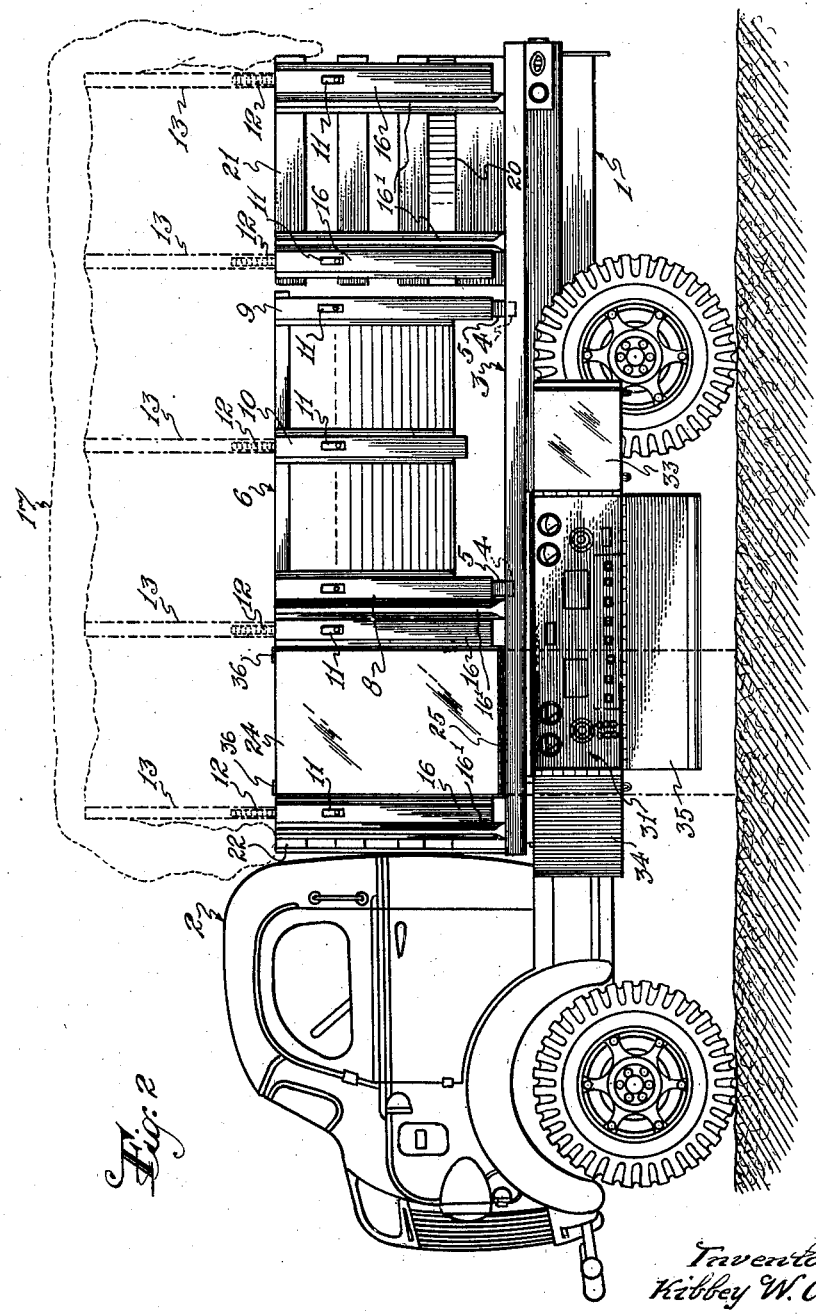

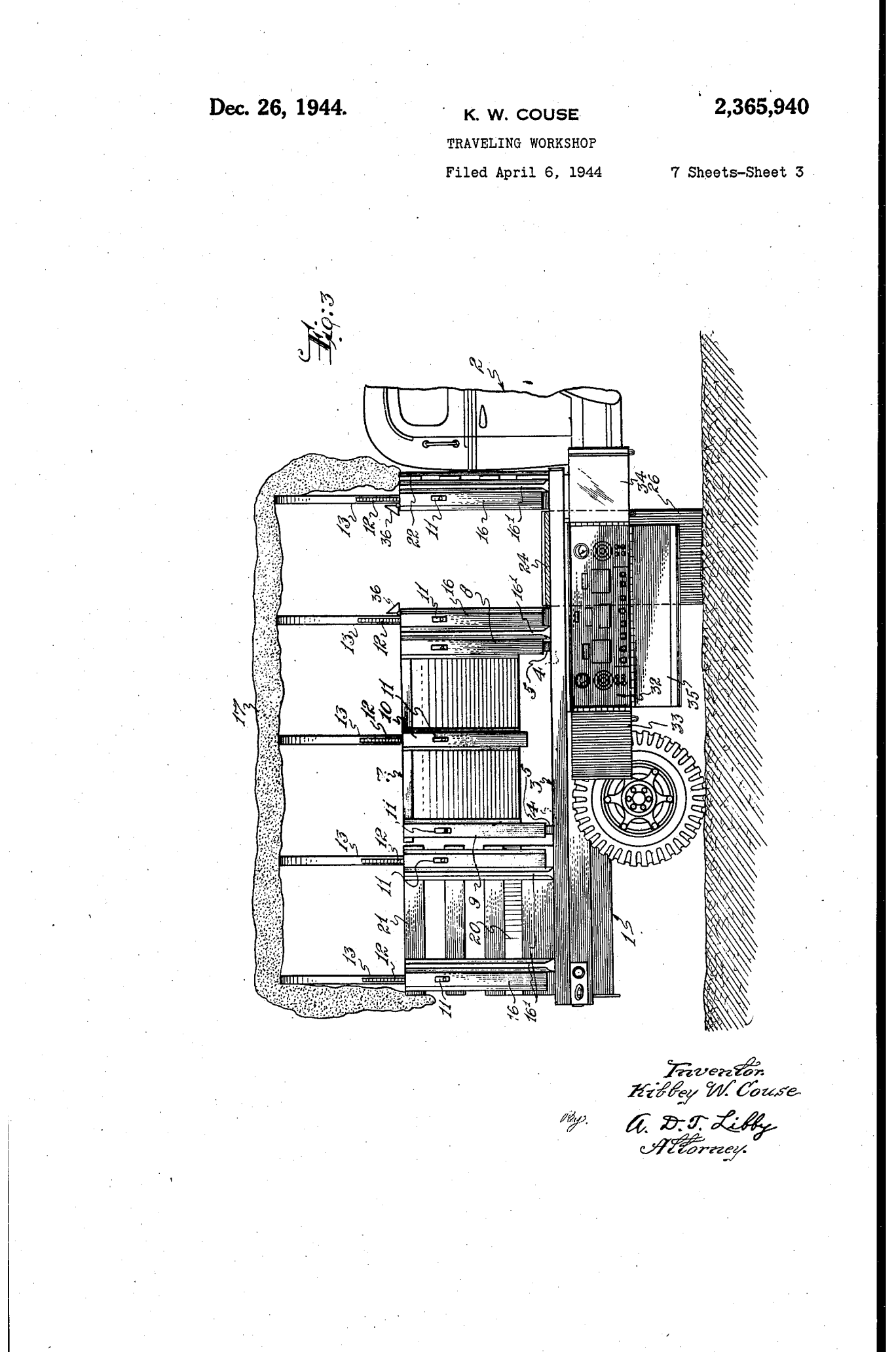

Inventor
Kibbey W. Couse
A. D. T. Libby
Attorney.

Dec. 26, 1944.  K. W. COUSE  2,365,940
TRAVELING WORKSHOP
Filed April 6, 1944  7 Sheets-Sheet 4
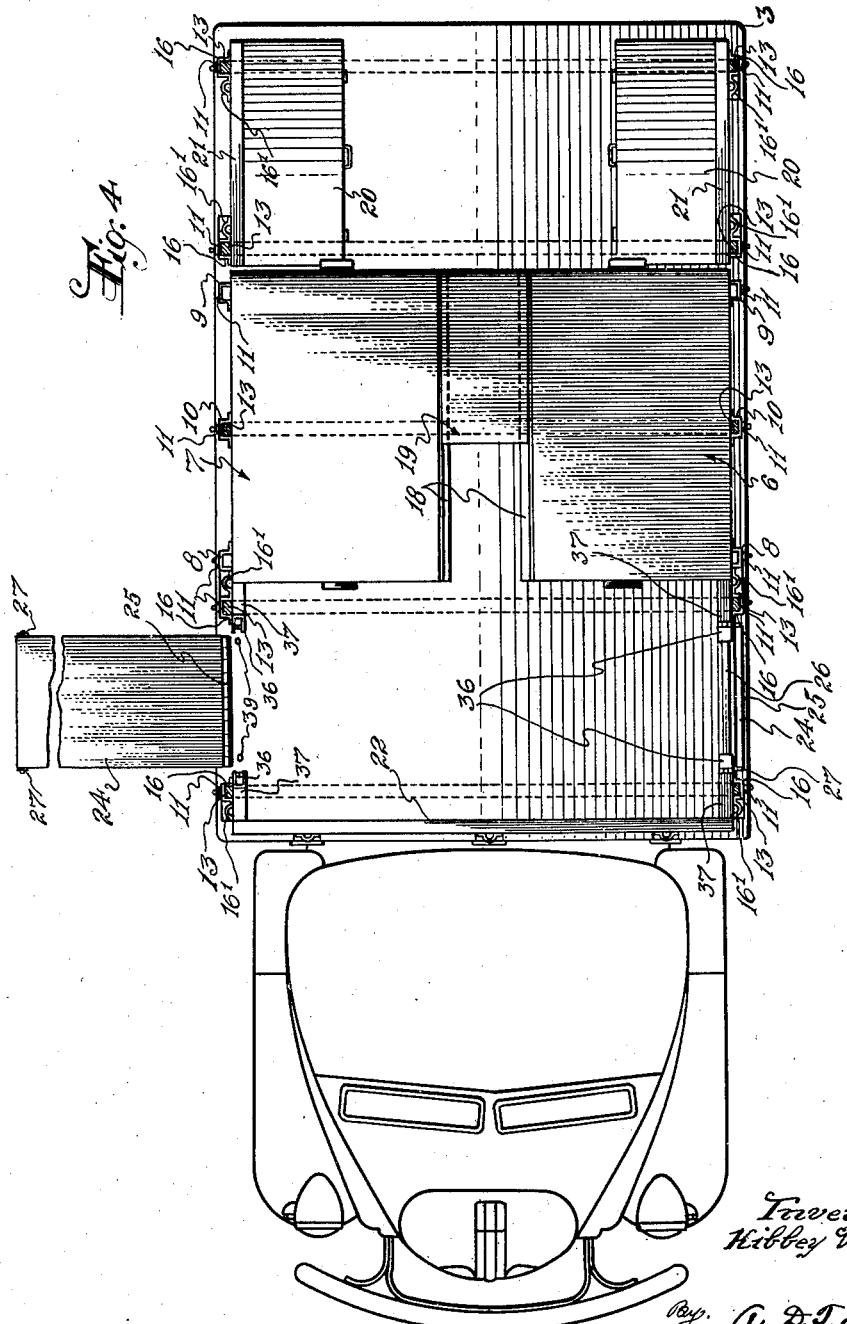

Dec. 26, 1944.    K. W. COUSE    2,365,940
TRAVELING WORKSHOP
Filed April 6, 1944    7 Sheets-Sheet 5

Inventor.
Kibbey W. Couse.
By A. D. T. Libby
Attorney.

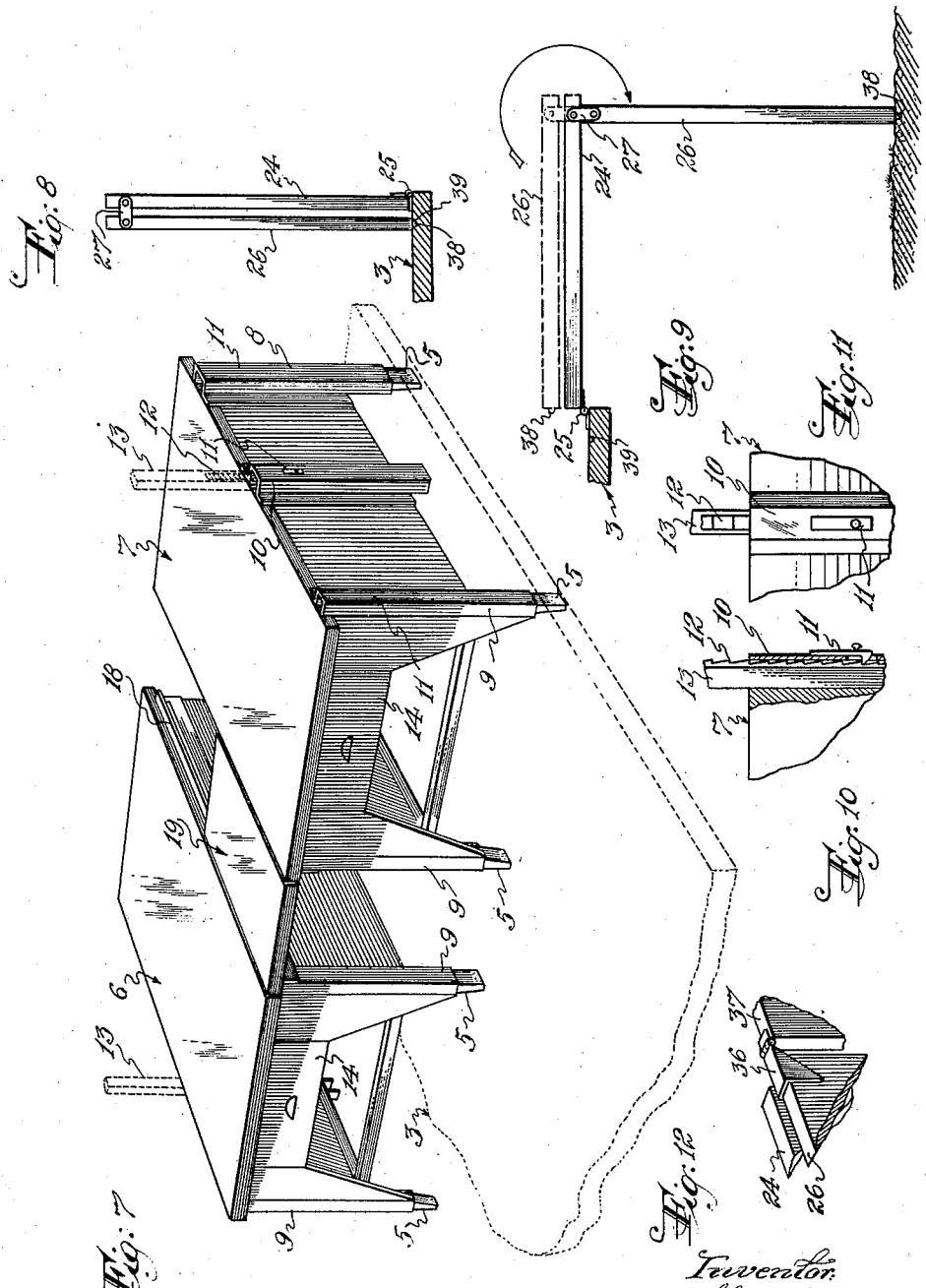

Dec. 26, 1944.   K. W. COUSE   2,365,940
TRAVELING WORKSHOP
Filed April 6, 1944   7 Sheets-Sheet 7
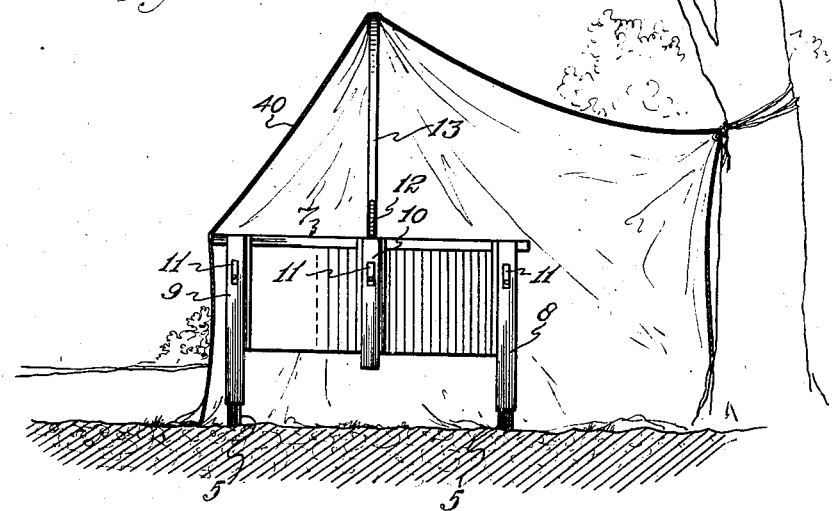
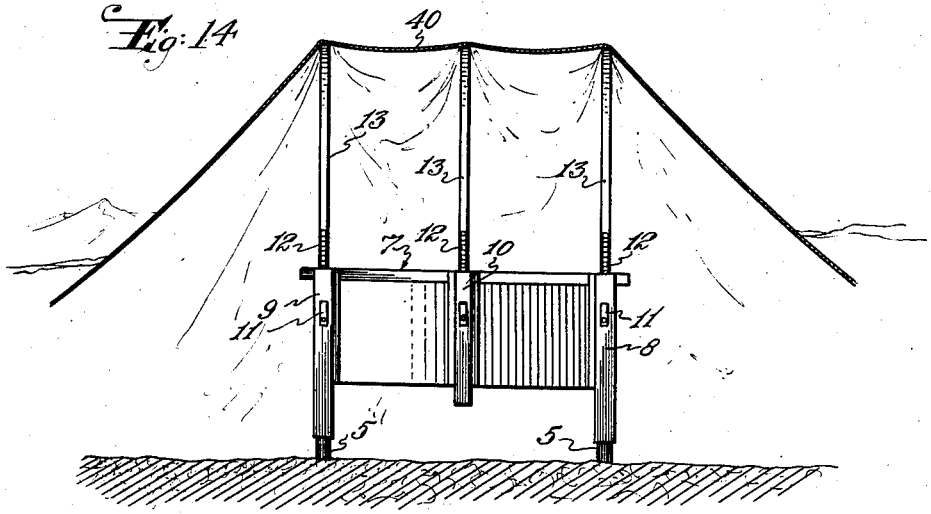
INVENTOR.
Kibbey W. Couse
BY A. D. T. Libby
Attorney.

Patented Dec. 26, 1944

2,365,940

UNITED STATES PATENT OFFICE 2,365,940

TRAVELING WORKSHOP

Kibbey W. Couse, Newark, N. J.

Application April 6, 1944, Serial No. 529,737

9 Claims. (Cl. 296—24)

This invention relates to a traveling work shop having certain important features differing materially from those illustrated in my Design Patent D-109,942, issued May 31, 1938.

It is the principal object of my present invention to provide a traveling work shop which may be considered as an adjunct to that shown in the above-mentioned patent; also to that shown in my application, Serial No. 464,132, filed October 31, 1942, now Patent No. 2,358,446, granted September 19, 1944. All of these types have been found highly essential in war activities.

Another object of my invention is to provide a traveling work shop in which certain of the structures forming part of the equipment perform dual functions.

Another object of my invention is to provide new and improved units for controlling the electrical equipment carried by the shop.

Other and further objects will appear from the following description taken in connection with the drawings, wherein:

Figure 1 is a side view of the traveling work shop, showing certain of the details of the body at one end thereof adjacent the cab.

Figure 2 is a view similar to Figure 1, but with the front body doors in closed position, and doors acting as closures for certain electrical control boxes in open position.

Figure 3 is a view somewhat similar to Figure 2, but from the opposite side of the shop, showing a different type of electrical control box.

Figure 4 is a top plan view of the shop with the cover removed and with one of the body doors in open position to form a platform.

Figure 7 is a perspective view of the work benches per se as they are positioned in the shop.

Figure 8 is an end elevation of one of the doors made out of two panels in closed position.

Figure 9 is a view of the door panels in open position, being positioned for use as a platform.

Figures 10 and 11 are fragmentary views showing details of the means for regulating the height of the roof-support members.

Figure 12 is a fragmentary view showing the manner of holding the door panels in closed position.

Figures 13 and 14 show how the work benches or tables may be used for a dual purpose.

Figure 5:
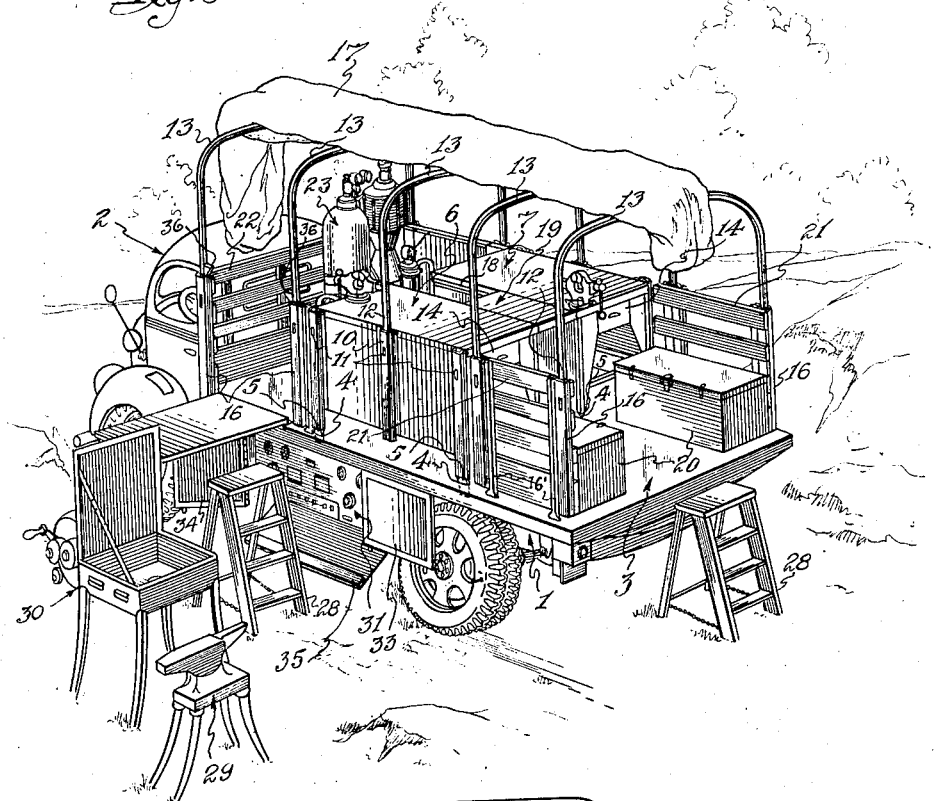
Figure 5 is a perspective view of the shop, showing certain of the parts in position thereon with other parts removed.

Referring now to the details, wherein like numbers refer to corresponding parts, 1 is a chassis comprising a frame with running gear and driving mechanism and a cab 2. On the chassis is mounted a floor 3, having recesses or sockets 4 along its opposite sides to receive the leg ends 5 of two work benches 6 and 7.

These benches are made of substantial material so as to provide strong and rigid structures, and have drawers 14 in their opposite ends. It will be noted from Figure 5 that the tables 6 and 7 are positioned on the floor 3 so that their outer sides form body closure parts. These outer sides at the ends of the benches are provided with elongated socket members 8 and 9, at the lower ends of which are positioned the leg ends 5. Intermediate the end sockets 8 and 9, is an auxiliary elongated socket 10. These sockets are preferably made of steel and are fastened to the benches in any satisfactory manner as by welding, provided the benches are made of steel, or by screws if the benches are of wood. The socket 10 carries a pawl 11 adapted to engage a ratchet member 12 fastened to a canopy or roof-supporting members 13 which are preferably rectangular in cross-section to fit the sockets 8, 9 or 10 which are rectangular in shape when in position.

Other elongated socket members 16 are fastened as by welding to the members 16' that come with the chassis, already attached to the floor 3 (see Figure 4). The members 16 are also provided with pawls 11 and ratchets 12, whereby the canopy or roof-support members 13 may be raised and lowered to change the air space under the cover 17 if desired.

Since the benches or desks 6 and 7 are mounted on opposite sides of the floor 3, a space is left between the benches. This is utilized by providing rails 18 on the inner edges of the benches to receive a sliding plate 19 which very advantageously makes a surface connection between the benches at any desired space between their ends.

Carried in fixed position on the floor 3, at the rear end of the shop, are two boxes 20 which may carry tools or other equipment required in the operation of the work shop. When the boxes are closed as shown in Figure 5, they are used as seats for the occupants of the shop. Back of the boxes there are provided slat-type body members 21 that are fastened to the uprights or socket members 16. The forward end of the body is separated from the cab by slat-type frame members 22, and positioned in the space between the members 22 and the benches 6 and 7, there may be numerous articles of use, such as acetylene tank equipment 23, which is mounted on trucks so that it can be easily removed from the work shop by rolling it down a ramp formed by a two-panel door.

Figure 6:
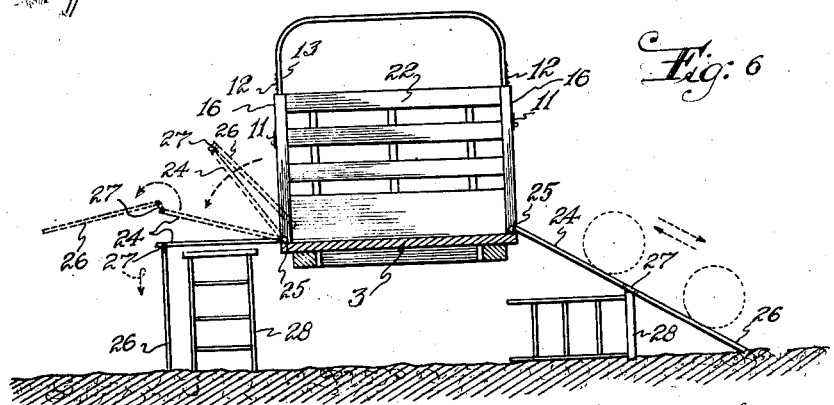
Figure 6 is a semi-diagrammatic section through the front end of the body, showing the folding body doors on one side used as a platform, and on the other side, as a ramp.

The outer panel 24 of the two-panel door is hinged at 25 to the body, while the inner panel 26 is hinged at 27 to the outer panel 24. In order to utilize the door panels as a ramp, a support is necessary at the joint 27, and this is provided by having a step-ladder 28, the top or some part of which is of sufficient width to reach from the ground to the ramp when the ladder is laid on its side as is shown in the right-hand part of Figure 6. In this same figure, the door panels on the opposite side of the shop are folded down to provide a platform which can be reached by the step-ladder as shown in Figure 5. When the panels 24 and 26 are folded up and in closed position as indicated in Figure 8, a pair of catches 36 are fastened to a body frame member 37, and these catches are adapted to be snapped over the inner panel 26 as shown in Figures 1 and 12. Preferably, the inner panel 26 has projections 38 adapted to engage depressions 39 in the floor to prevent the panel from flopping around when the panels are in closed position (see Figure 4).

Some of the other apparatus which may go into the space adjacent the acetylene tank 23 are an anvil 29 and a hand forge 30.

Fastened to the bottom part of the chassis on each side of the shop, between the front and rear wheels, there is a control box carrying switches, plug-in sockets, meters, etc., whereby connections to the electric equipment carried by the chassis (but not shown in the drawings) may be quickly made. The box or cubicle 31, shown in the left-hand side of the shop in Figure 5, is designed to handle all D. C. apparatus; while the cubicle 32 on the right-hand side of the chassis is designed to handle all A. C. apparatus and circuits. Each of the boxes or cubicles is completely closed on the outside by a double-door arrangement, in which two swinging doors 33 and 34 open to the right and left on one side and from left and right on the other side, as shown in Figure 3, while an outer door 35 is hinged to swing downwardly, thereby completely sealing the contents of the cubicles from the elements.

It may sometimes happen that the benches 6 and 7 can be advantageously used outside of the shop, in which case they may be readily moved by pulling them up out of their socket supports and taking them out of the shop and placing them on the ground as indicated in Figures 13 and 14, but even in this position it may be found necessary to use a covering or canopy 40 or cover 17 over the benches in some manner as indicated in Figures 13 and 14. If necessary, extra-length supports, adapted to fit into the elongated socket members 8, 9 and 10, may be used.

From what has been said, it will be readily understood that I have provided a traveling work shop which has several unique and advantageous features that, so far as I am aware, are not found in any other type of automotive vehicle.

What I claim is:

1. A traveling work shop having a chassis, a floor fastened to the chassis and forming part of the body, the floor having sockets located along its opposite edges, oppositely disposed work benches carried on the floor and having their outer sides forming body-closure parts, said benches being held in place on the floor by having leg ends fitting in certain of said floor sockets, the inner sides of the benches having slide rails and a slide plate carried on the rails, and oppositely disposed tool-box seats carried on the floor at the rear end thereof.

2. A traveling work shop having a chassis, a floor fastened to the chassis and forming part of the body, the floor having sockets located along its opposite edges, oppositely disposed work benches carried on the floor and having their outer sides forming body-closure parts, said benches being held in place on the floor by having leg ends fitting in certain of said floor sockets, the inner sides of the benches having slide rails and a slide plate carried on the rails, the outer sides of said benches having elongated socket members to receive roof-supports for assisting in carrying a cover.

3. A traveling work shop having a chassis, a floor fastened to the chassis and forming part of the body, the floor having sockets located along its opposite edges, oppositely disposed work benches carried on the floor and having their outer sides forming body-closure parts, said benches being held in place on the floor by having leg ends fitting in certain of said floor sockets, the inner sides of the benches having slide rails and a slide plate carried on the rails, the outer sides of said benches having elongated socket members to receive roof-supports for assisting in carrying a cover, and supply-box seats carried on the floor at its rear end.

4. A traveling work shop having a chassis, a floor fastened to the chassis and forming part of the body, the floor having sockets located along its opposite edges, oppositely disposed work benches carried on the floor and having their outer sides forming body-closure parts, said benches being held in place on the floor by having leg ends fitting in certain of said floor sockets, the inner sides of the benches having slide rails and a slide plate carried on the rails, the outer sides of said benches having elongated socket members to receive roof-supports for assisting in carrying a cover, and supply-box seats carried on the floor at its rear end, additional roof-support socket members similar to those carried by the benches fastened to other parts of the body projecting from the floor, and means for vertically adjusting the roof supports in said socket members.

5. A traveling work shop having a chassis, a floor fastened to the chassis and forming part of the body, the floor having sockets located along its opposite edges, oppositely disposed work benches carried on the floor and having their outer sides forming body-closure parts, said benches being held in place on the floor by having leg ends fitting in certain of said floor sockets, the inner sides of the benches having slide rails and a slide plate carried on the rails, additional parts for the body comprising foldable panels on each side forward of said benches and forming, when closed, a door for each side, and, when open, forming a platform or a ramp as desired.

6. A traveling work shop having a chassis, a floor fastened to the chassis and forming part of the body, the floor having sockets located along its opposite edges, oppositely disposed work benches carried on the floor and having their outer sides forming body-closure parts, said benches being held in place on the floor by having leg ends fitting in certain of said floor sockets.

the inner sides of the benches having slide rails and a slide plate carried on the rails, additional parts for the body comprising foldable panels on each side forward of said benches and forming, when closed, a door for each side, and when open, forming a platform or a ramp as desired, the shop having as part of its equipment a step-ladder having a width so it can be used as a brace for the panels at their union when they are extended for a ramp.

7. A traveling work shop havin a chassis carrying both direct and alternating current equipment, a floor fastened to the chassis and forming part of the body, the floor having sockets located along its opposite edges, oppositely disposed work benches carried on the floor and having their outer sides forming body-closure parts, said benches being held in place on the floor by having leg ends fitting in certain of said floor sockets, the inner sides of the benches having slide rails and a slide plate carried on the rails, the outer sides of said benches having elongated socket members to receive roof-supports for assisting in carrying a cover, supply-box seats carried on the floor at its rear end, and electrical control boxes or cubicles for controlling the operation of said electrical equipment carried by the chassis on its opposite sides with closure means for securely housing the cubicles from the elements.

8. A traveling work shop having a chassis, a floor fastened to the chassis and forming part of the body, the floor having sockets located along its opposide edges, oppositely disposed work benches carried on the floor and having their outer sides forming body-closure parts, said benches being held in place on the floor by having leg ends fitting in certain of said floor sockets, the benches being quickly removable for use off the work shop and provided with elongated sockets to receive, if necessary, extended support members and a canopy over said members.

9. A traveling work shop having a chassis carrying both direct and alternating current equipment, a body including a floor carried by the chassis and sides formed in part by quickly removable benches and foldable panel doors which, when opened, may take the form of a platform or a ramp, a top supported in part from said benches, the shop carrying on opposite sides of the chassis, electrical control cubicles for controlling the operation of said electrical equipment, with means for securely housing them from the elements and also carrying on the floor at the rear, combined seats and work boxes.

KIBBEY W. COUSE.